1,919,566

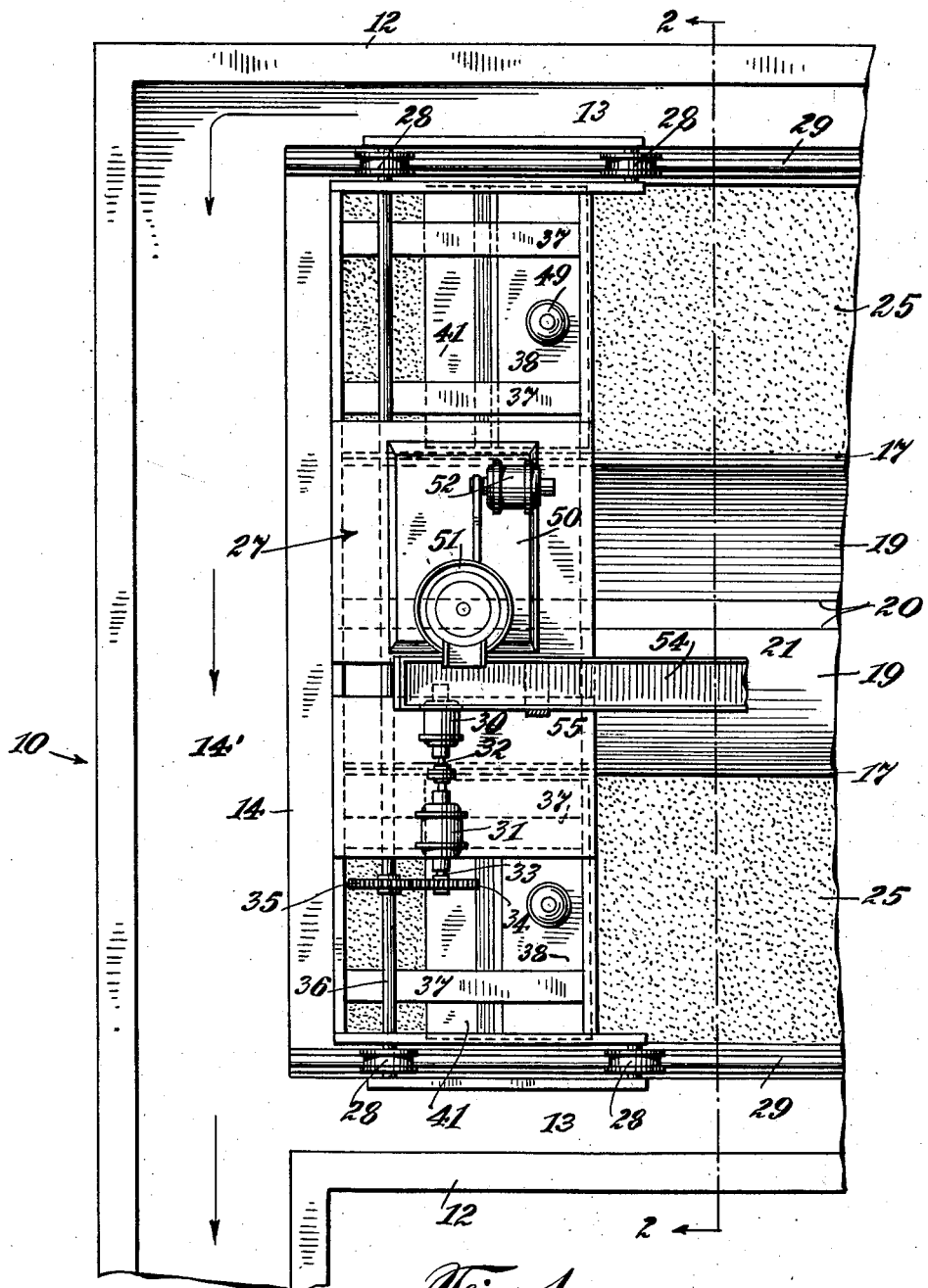

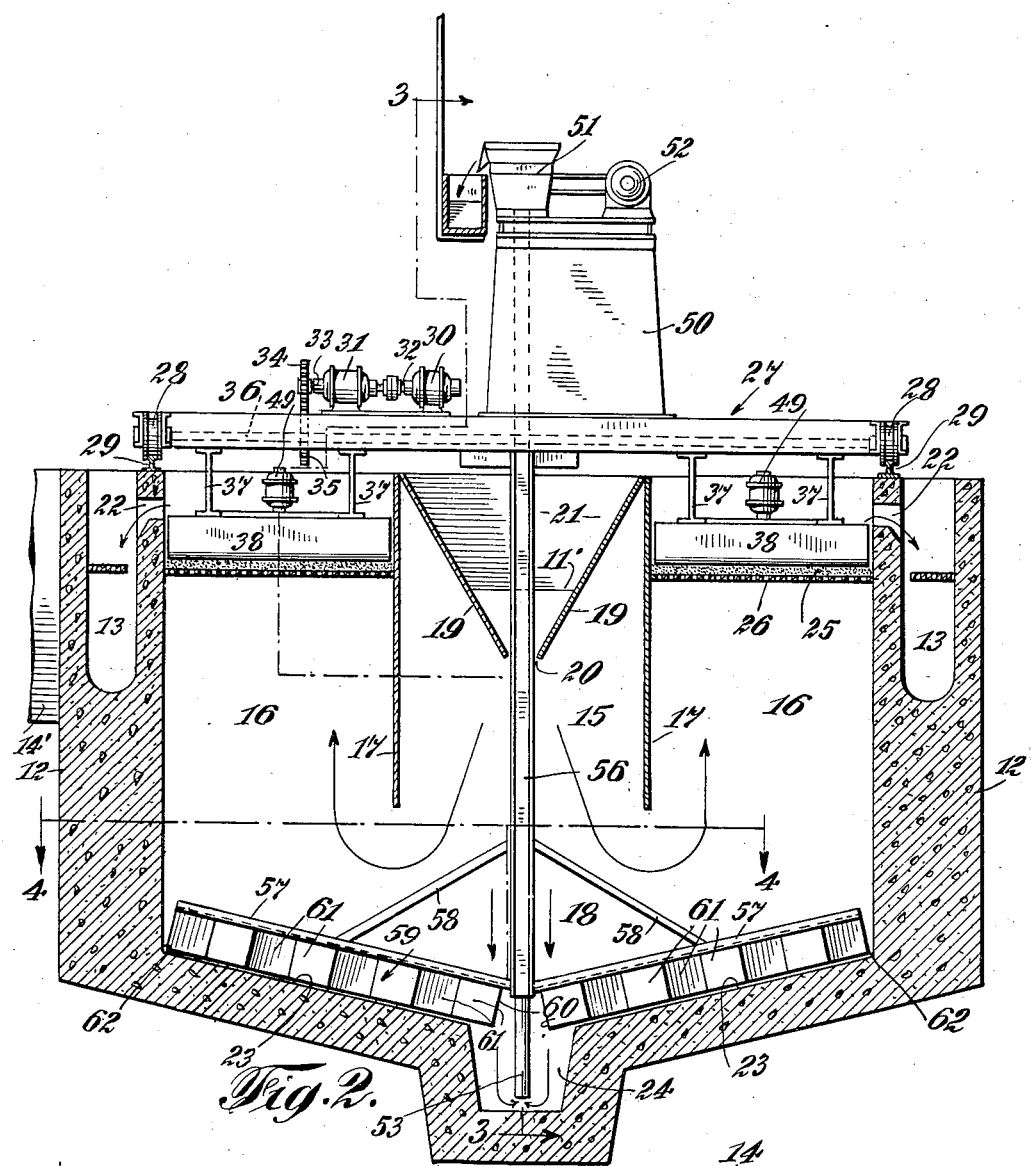
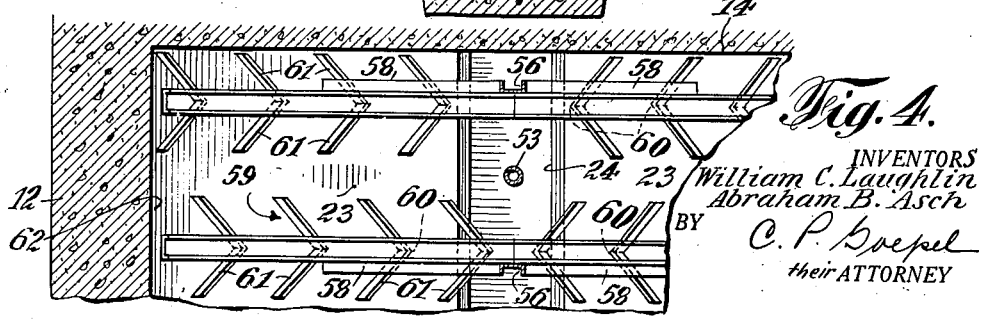

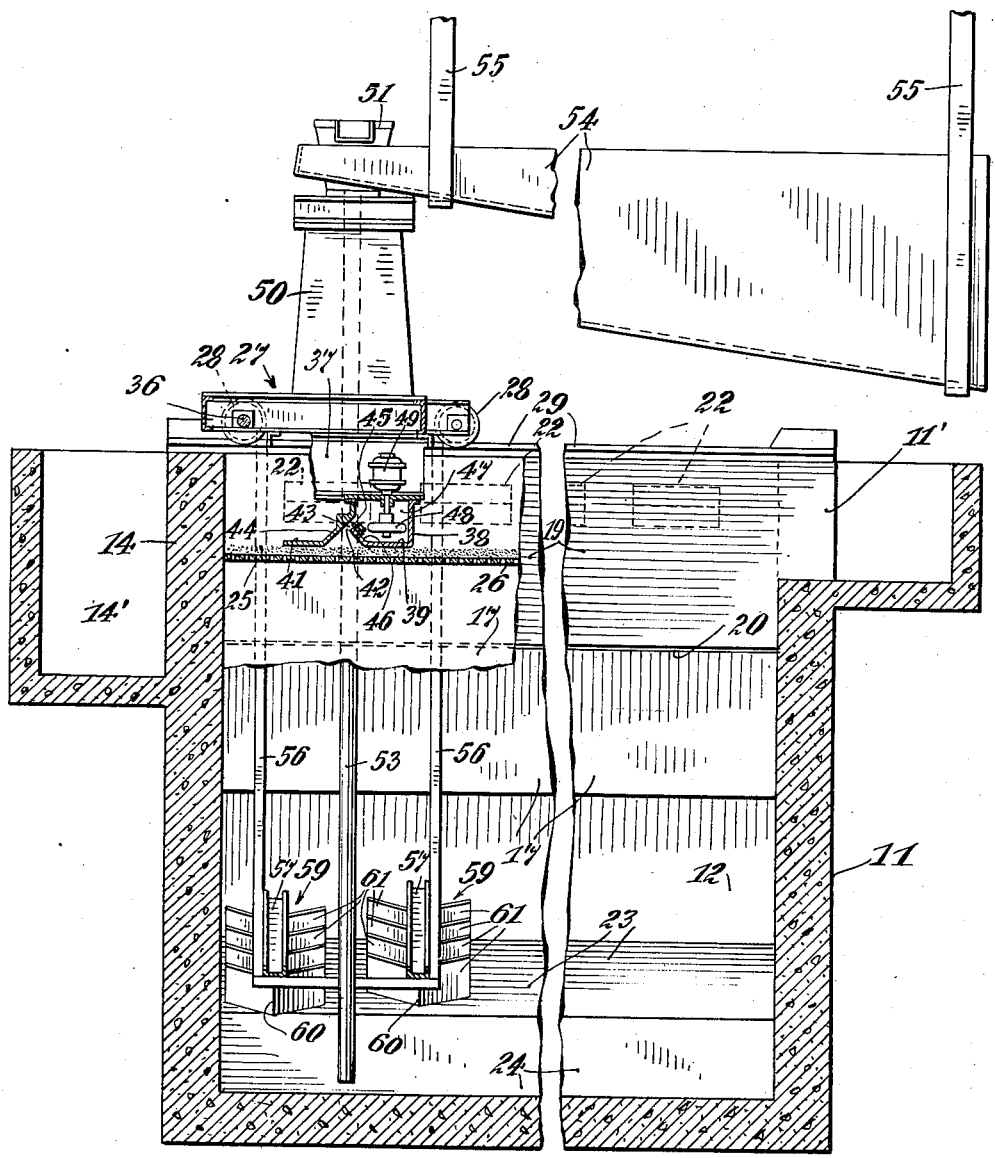
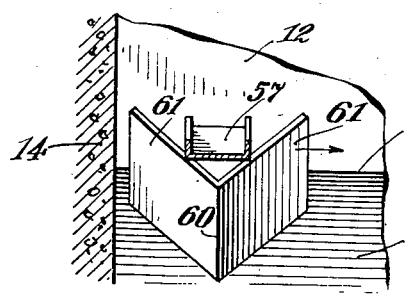
Fig. 3.
Fig. 5.
INVENTORS
William C. Laughlin
Abraham B. Asch
BY
their ATTORNEY Patented July 25, 1933

UNITED STATES PATENT OFFICE

WILLIAM C. LAUGHLIN, OF KEW GARDENS, AND ABRAHAM B. ASCH, OF BROOKLYN, NEW YORK, ASSIGNORS TO FILTRATION EQUIPMENT CORPORATION, OF NEW YORK, N. Y., A CORPORATION OF DELAWARE

SEWAGE CLARIFICATION TANK AND CLEANING MACHINE THEREFOR

Application filed July 28, 1931. Serial No. 553,529.

Our present invention relates to sewage clarification tanks, more particularly to tanks of the character which are furnished with filter beds for filtering out impurities; and the invention has for its purpose and object to provide an improved clarification tank embodying improved means for cleaning the filter beds therein without interfering either with the filtering operations or with the processes of sewage treatment, transpiring within the tank.

An object of the invention is to provide, in a sewage clarification tank, a novel filter bed cleaning system and arrangement whereby the solids and impurities, entrapped and enmeshed in the filter bed, will be separated from the effluent liquid that is practically free of solids and impurities. A further object is to collect the separated dirty water, solids and impurities and to draw the same out of the tank for re-circulation or for such other disposition as may be desired, while permitting the clarified effluent to rise to its discharge outlet by reason of its natural movement towards its liquid level.

Another object of the invention is to provide novel devices by means of which, in connection with the cleaning of the filter bed, to scrape and move the sludge settlings into a trough or pocket from where accumulations can readily be withdrawn by a sludge pump. According to the system of our invention, the cleaning of the filter bed and the gathering and removal of the sludge settlings may take place continuously.

For the attainment of its objects, the invention in its evolvement has in view the provision of a water-head for the inflowing sewage liquid or material and the level of this water-head is at an elevation above the discharge outlet for the clarified effluent. Over the filter bed is arranged a traveling filter bed cleaning device having a collector chamber; and the filter bed and cleaning device are so relatively positioned that the inlet to the collector chamber is below the level of the discharge outlet, so that by reason of the elevation of the water-head, the liquid in the immediate territory of the cleaning device will be forced over the inlet into the collector chamber, whereas the liquid outside of the territory of the cleaning device will be forced to the elevation necessary to pass through the discharge outlets. According to a feature of the arrangement, the inlet to the collector chamber is restricted; and it is made adjustable as to height so that the level of this inlet may be varied with respect to the level of the water-head. By virtue of this provision, the pressure and velocity of the liquid upwardly through the filter bed in the territory of the cleaning device may be controlled.

The cleaning device of our invention may be furnished with means whereby to agitate and stir up the sand or magnetite composing the filter bed so that the matter enmeshed therein will be promptly released into the current which moves upwardly into the inlet to the collector chamber. Examples of agitating and stirring means for such purpose, although not illustrated and described herein, are fully illustrated and described in our three copending applications for patents, Serial Nos. 553,526, (Patent No. 1,872,759); 553,527; and 553,528, all filed July 28, 1931.

Our invention also includes the provision of a discharge pump for pumping the dirty liquid and impure substances from the collector chamber as rapidly as they accumulate therein.

It is within the province of our invention to provide a clarification tank which may have two (or more) filter beds of sand or the like, and, in correspondence therewith, two (or more) cleaning devices for operating on the sand; and further to provide an overhead carriage or trolley which carries the cleaning devices together with the pumps and discharge lines for discharging the dirty liquids from the cleaning devices. This carriage or trolley supports for movement therewith the scraping devices, sludge removal pipe and sludge pump as well as the motor for operating the sludge pump. The carriage is equipped with wheels which turn on guide track rails positioned along the top of the tank; and it may be equipped with a power unit whereby to be self-propelled on the track rails.

By means of the carriage or trolley, the and sludge removal pipe, are moved continuously along the clarification tank, first forwardly and then backwardly, from one end thereof to the other. As a result, the tank bottom and filter beds are not permitted to get very dirty, and hence can be well cleaned during the travel of the carriage.

With the foregoing and other objects in view, the invention consists in the construction and relative arrangement of parts so combined as to coact and cooperate with each other in the performance of the functions and the accomplishment of the results herein contemplated, and comprises in one of its adaptations the preferred form illustrated in the accompanying drawings, in which:—

Figure 1 represents a top plan view, showing an end portion of a clarification tank having two filter beds and a water-head, and equipped with a cleaning machine made in accordance with our invention;

Fig. 2 is a detail vertical sectional view, transversely of the tank, taken on the line 2—2 of Fig. 1, and showing the cleaning machine in elevation;

Fig. 3 is a vertical sectional view, through the tank and cleaning machine, taken longitudinally of the tank on the line 3—3 of Fig. 2, the entire central portion of the tank being broken away so that only the opposite end portions of the tank appear in the view;

Fig. 4 represents a sectional plan view taken on the line 4—4 of Fig. 2, showing the form and arrangement of the scraper devices; and Fig. 5 is a detail perspective view of one of the scraper devices, with the channel support therefor shown in section.

The sewage clarification tank, fractionally illustrated in the accompanying drawings and in connection with which we have shown an embodiment of our cleaning machine as a preferred example, is denoted in general by the reference numeral 10, and this tank in practice may consist of an elongated structure built from concrete or any material that may be suitable or approved for the purpose. One end 11 of the tank is provided with an inlet 11' (Fig. 3) for the inflow of the sewage liquid. The opposite longitudinal side walls 12, 12 of the tank are each provided with a launder or trough 13 for carrying away the effluent, and at the other end 14 of the tank these launders or troughs empty into a main conduit 14' by which the effluent is conveyed away for disposition in any manner desired.

The interior of the tank is divided into a central chamber 15 and side chambers 16 by baffles 17 located in the upper portion of the tank and which terminate at their lower ends intermediate the height of the tank so as to provide in the bottom portion of the tank an open chamber 18 with which the central chamber 15 and each of the side chambers 16 can communicate. The upper portion of the chamber 15 is divided off by downwardly extending baffles 19 which converge as they extend downwardly in order to provide a restricted feed opening 20. The inlet 11' is in direct communication with the chamber 21 between the baffles 19, and the sewage fluid which fills the chamber 21 constitutes a waterhead the level of which is elevated above the spaced outlets 22 provided in the longitudinal sides of the tank for the discharge of the effluent into the launders 13. By reason of the provision of the water-head, a force is provided for moving the liquid upwardly through the side chambers 16 for discharge through the outlets 22. It is to be noted here that the central chamber 15, two side chambers 16, 16 and water-head chamber 21 all extend lengthwise of the tank, with the central chamber 15 and water-head chamber 21 occupying positions between the side chambers 16, 16.

The character of the sewage liquid which enters through the inlet 11 and fills the tank including the water-head 21, central chamber 15, bottom chambers 18 and side chambers 16, 16 need not be treated of herein. Also the details of the processes whereby the sewage solids, whether colloidal or suspended, are first converted into a slime-like strata of cellulose and sewage solids, and then when in such state are subjected to coagulation so that the imbibed water will be given up, need not be explained herein. The principle involved in these operations are fully set forth in the application of William C. Laughlin, one of the applicants herein, Serial No. 499,195, filed December 1, 1930, for a Method of conditioning sewage. It is sufficient to state here that the coagulated colloids including the solids of the sewage, which have a higher specific gravity than the water, settle downwardly to the bottom of the tank, while the lighter water, solids, and impurities rise in the side chambers under pressure to the discharge outlets 22. The relatively heavy matter or sludge settles onto the sloping bottom portions 23 of the tank from which it is scraped into the central channel or pocket 24.

In the upper portion of each of the side chambers 16 and below the plane of the discharge outlets 22, is provided a filter bed 25, consisting of sand or any suitable granular material. The water and impurities rising in the side chambers 16 by reason of the pressure head, pass upwardly through the filter beds where the filtering out of the impurities takes place, and the clear water effluent resulting from the filtering action rises upwardly for its discharge through the outlets 22. The filter beds are supported upon suitable filter screens 26.

The machine or apparatus for cleaning the filter beds includes a traveling carriage which is designated in general by the numeral 27, and which may consist of any suitable framework capable of carrying the various parts which make up the complete operative apparatus. At its opposite ends the carriage is provided with a pair of wheels 28 which turn on track rails 29 provided upon the longitudinal sides 12 and inwardly of the positions of the effluent launders 13. These track rails provide for the movement of the carriage for the full length of the elongated filter beds so that the sand can be cleaned throughout the length of the beds. By preference the carriage is furnished with its own power means, and such means may consist of an electric motor 30 which is mounted upon the framework, and in association with the motor, a reduction gear box 31 whereby, from the motor shaft 32, to operate the driving shaft 33 at reduced speed. The driving shaft carries a gear 34 which is in driving engagement with a gear 35 mounted upon a shaft or axle 36. At each end of the carriage, one of the two track wheels is mounted on the shaft or axle 36. In the present embodiment, two filter cleaning devices are provided, one for each of the filter beds. These cleaning devices are suspended from the carriage by means of suitable I-beams 37. Inasmuch as the two cleaning devices are duplicates, a detail description of one of them will suffice for the other.

Each cleaning device includes a cleaner or cleaning tank 38 of a size to fit, transversely of the bed, between the baffle 17 and side wall 12, the fit in this regard being such that while the opposite sides of the cleaner come in close adjacency to said respective parts, yet they are not permitted to contact with these parts because contact therewith would provide resistance to the movement of the carriage. The bottom 39 of the cleaner, in the direction of the length of the sand bed, is such as will define a definite territory or area of resistance to the pressural tide of liquid rising upwardly through the bed. In the present instance, the dimension of the cleaner, lengthwise of the bed, is increased by the provision of an apron or plate 41 which is in alignment with the bottom 39. The cleaner 38 between the bottom 39 and apron 41, and for the full dimension of the cleaner between the baffle 17 and side wall 12, is provided with a neck or inlet opening 42, which communicates at its top with a restricted feed opening 43 formed between the baffle 44 and a weir 45 mounted upon the baffle 46. The water rising in the inlet 42 between the baffles 44 and 46 passes over the weir 45 and falls into the interior chamber 47 of the cleaner. The weir 45 by any suitable adjustable connection (not shown), is connected with the baffle 46 for relative adjustment upwardly and downwardly with respect thereto. The inlet 42 is located substantially midway of the combined length of the body of the cleaner and its apron, so that for the territory of resistance afforded by the device, the dirty water and impurities carried thereby will be forced to rise through the inlet 42 and pass over the weir into the interior chamber 47.

It will be apparent that by reason of the elevation of the water-head, any adjustment, upwardly or downwardly, of the weir will influence the pressure and velocity of the liquid upwardly through the filter bed for the territory occupied by the device. The weir, therefore, may be adjusted in the precise position which will cause the sand between the screen 26 at the bottom of the bed and the bottom 39 and apron 41 at the top of the bed, to be kept in an agitated condition, undulating up and down, by the pressure and velocity of the water moving under pressure to the inlet 42. When the sand is thus buoyed up and agitated, the dirt enmeshed therein will be released into the liquid destined to pass upwardly through the inlet 42, over the weir 45 and into the chamber 47. In this way the dirty liquid resulting from washing the sand is collected in the interior of the cleaner.

Outside the territory occupied by the tank 38 and its apron, the water which rises from the filter bed where the sand has not been agitated, is clear and rises under pressure to the discharge outlets 22. The cleaner, it will be observed, shuts out the clear water, so that only the dirty water and impurities released through the agitation of the sand, will enter the chamber 47. The dirty water is removed from the chamber 47 by means of a centrifugal pump 48 operated by an electric motor 49, located upon the top of the tank where it is above the level of the flow of clear water through the discharge openings 22. The dirty water and impurities pumped out by the pump may be disposed of in any suitable manner. If desired, they may be pumped into the water-head 21 for re-circulation through the clarification tank.

The carriage or trolley, carrying the two cleaning devices, moves forwardly and backwardly along the elongated tank so as to intervally clean all portions of the two sand beds from one end thereof to the other. The carriage is kept in continuous movement and the object is to clean all portions of the beds so frequently that there will be no opportunity for the sand to become very dirty. The cleaner the beds are kept, the cleaner the effluent will be. Owing to the provision of the water-head, which induces a flow of the liquid into the dirty water chamber of each of the cleaning tanks and as well through the higher discharge outlets 22, and the fact that each cleaning tank shuts out the clear water effluent while defining a territory of resistance or agitation wherein the dirty water and impurities within the bed are released for movement with the stream into the dirty water chamber, there results a constant separation of the impurities from the bed so that in practice the latter is practically free of solids and impurities. By returning the separated dirty water and impurities back to the water-head, these are put into recirculation for re-treatment within the clarification tank.

Collecting or gathering means are provided whereby, simultaneously with the cleaning of the sand beds, the sludge which settles upon the bottom of the clarification tank will be worked or scraped into the channel or pocket 24 and then pumped from the tank. For this purpose, we provide upon the carriage 27 a pump stand or erection 50. Mounted upon the top of this stand is a pump 51, which is operated in any suitable manner from an electric motor 52, also mounted upon the sand. A sludge suction pipe 53 is connected with the pump 51, and this pipe extends downwardly through the stand in a position in which it will pass through the restricted feed opening 20 and into the channel 24. By the operation of the pump, the sludge settlings which accumulate in the channel or pocket 24 are withdrawn and discharged into a downwardly inclined trough 54 to be conveyed thereby to such place or places as may be desired. The trough 54 is supported by any suitable overhead framework (not shown) by means of hangers 55.

Supported by and depending from the carriage at either side of the sludge pipe 53 are I-beam supports 56. These supporting parts, like the sludge pipe, extend downwardly through the restricted feed opening 20; and in this connection it will be noted that the baffle walls 19 with the opening 20 provide a travelway in which the pipe 53 and supports 56 move with the movement of the carriage. Each of the supports at its lower end, which terminates a distance above the channel 24, carries two oppositely projecting channel-shaped arms 57. Suitably inclined braces 58 connect the arms with the beams so as to provide a rigid depending structure which moves with the carriage. Two arms 57 are thus provided over each of the downwardly inclined bottoms 23 and the arms are positioned so that they will lie substantially parallel with the bottom below them. The two arms thus arranged above each bottom carry a series of spaced-apart scrapers 59. The apexes 60 of these scrapers are pointed toward the channel 24, while the opposite converging sides 61 thereof face in opposite directions, so that one or the other of the faces will have a sludge removing action irrespective of the direction of movement, forwardly or backwardly, of the carriage. As shown in Fig. 4, the scrapers of the two arms above each inclined bottom are in staggered relation so that the trails of material which are left by the lead scrapers will be picked up by the scrapers on the arm which follows. By this arrangement, as the carriage travels forwardly and backwardly along the length of the clarification tank, the sludge which settles upon the downwardly inclined bottoms 23 will be worked or scraped into the channel 24. The scrapers are not permitted to come into actual contact with the inclined bottoms 23, for such contact would offer resistance to the travel of the carriage; but the scrapers are so supported that their lower edges will come in close proximity to the surfaces of the bottoms so that the sludge settlings will be substantially removed. By providing scrapers of V-shaped form and by pointing their apexes towards the channel 24, the sludge settlings in the corners 62 formed between the side walls 12 and bottoms 23, can be efficiently removed. Moreover, at the opposite ends 11 and 14 of the clarification tank, the free extremities of the scrapers can render efficient work in dislodging the sludge settlings. The continuous removal of the sludge, taking place almost as rapidly as it settles to the bottom of the tank, is an important aid to rapid clarification and it is also a very material aid to the rapid filtering of the sewage liquid by the filter beds.

The embodiment of our cleaning machine herein disclosed may be modified for use in connection with circular clarification tanks or square clarification tanks, as well as for elongated tanks of the type herein disclosed. It has been sought herein to illustrate only such an embodiment as will suffice to exhibit the character of the invention.

While our invention has been illustrated and described with some degree of particularity, it is realized that in practice various changes and alterations may be made therein, and further that the invention is capable of embodiment in many different tank constructions. It has been sought herein to illustrate only such an embodiment as will suffice to exhibit the character of the invention. Reservation is, therefore, made to the right and privilege of changing the form of the details of construction or otherwise altering the arrangement of the parts without departing from the spirit or scope of the invention or the scope of the appended claims.

We claim:—

1. Cleaning apparatus for a sewage system, comprising a sedimentation tank having a long horizontal filter bed above a bottom chamber and a baffle forming a travelway parallel to the bed, an overhead carriage traveling on the tank longitudinally of the bed and travelway, a cleaner device depending from the carriage and adapted to clean the bed during the movement of the carriage, said device including a vessel for the deposit therein of foul liquid produced by the cleaning operation, a frame member on the carriage extending downwardly therefrom through said travelway to move in the latter, and means carried by the member for collecting the settled solids in the bottom chamber during the movement of the carriage.

2. Cleaning apparatus for a sewage system, comprising a sedimentation tank, a longitudinal filter bed and travelway located within the tank and forming a bottom chamber therein, said travelway being in communication with the bottom chamber, a carriage traveling on the tank longitudinally of the bed and travelway and above the same, a frame member extending downwardly from the carriage through said travelway to move in the latter, and means carried by the member for collecting the solids which settle in the bottom chamber.

3. In cleaning apparatus for a sewage treatment system, consisting of a channel defined by side walls and a horizontal filter bed located between the side walls and forming upper and lower chambers in the channel, an overhead carriage on the side walls movable in the direction of the length of the bed, a travelway in communication with the lower chamber extending along the length of the bed, means for cleaning the bed and recovering foul liquid resulting from the cleaning operation, said means depending from the carriage in the upper chamber in such manner that it is moved by the carriage in a position in horizontal juxtaposition to the surface of the bed, and means depending from the carriage and extending downwardly through the travelway for collecting settled solids in the lower chamber, said last means being movable in the travelway by the carriage for collecting solids simultaneously with the cleaning of the bed.

4. In combination, a tank, a carriage arranged on the walls of the tank to move in the direction of the length thereof, a filter bed within the tank extending along the length thereof, said bed being located to form upper and lower chambers in the tank, a travelway within the tank adjacent one side of the bed and communicating with the lower chamber, a cleaner for the bed depending from the carriage in the upper chamber and being so disposed as to be moved in horizontal juxtaposition to the surface of the bed, a device for collecting settled solids in the lower chamber, and means for supporting the device for movement with the carriage to collect the solids simultaneously with the cleaning of the bed, said means comprising a frame depending from the carriage through said travelway.

5. In combination, a tank having a filter bed forming upper and lower chambers, a waterhead adjacent the bed and feeding into the lower chamber to cause flow of liquid upwardly through the bed, a carriage movable along the length of the tank and spanning the top thereof, a cleaning device depending from the carriage within the upper chamber and adapted, on movement of the carriage, to clean the bed, and a collector device depending from the carriage through said waterhead and operating in the lower chamber, said collector device being adapted, on movement of the carriage, to collect settled solids simultaneously with the cleaning of the bed.

6. In combination, a tank having a filter bed and travelway forming upper and lower chambers, said travelway including a passage in communication with the lower chamber, a carriage movable along the length of the tank above the bed and travelway, means within the upper chamber for cleaning the bed, said means being supported by the carriage and therewith movable, a device on the lower chamber for gathering settled solids, means supporting said device for movement with the carriage and comprising a frame extending downwardly from the carriage through the travelway passage, and means associated with the frame for withdrawing the solids as they are gathered.

WILLIAM C. LAUGHLIN.
ABRAHAM B. ASCH.